US010970129B2

(12) United States Patent
Tian et al.

(10) Patent No.: US 10,970,129 B2
(45) Date of Patent: Apr. 6, 2021

(54) INTELLIGENT GPU SCHEDULING IN A VIRTUALIZATION ENVIRONMENT

(71) Applicant: Intel Corporation, Santa Clara, CA (US)

(72) Inventors: Kun Tian, Shanghai (CN); Zhiyuan Lv, Beijing (CN); Yao Zu Dong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/156,550

(22) Filed: Oct. 10, 2018

(65) Prior Publication Data

US 2019/0286479 A1  Sep. 19, 2019

Related U.S. Application Data

(63) Continuation of application No. 14/779,234, filed on Sep. 22, 2015, now Pat. No. 10,133,597.

(51) Int. Cl.
*G06F 9/52* (2006.01)
*G06F 9/48* (2006.01)
*G06F 9/455* (2018.01)
*G06T 1/20* (2006.01)
*G06F 9/50* (2006.01)

(52) U.S. Cl.
CPC ............... *G06F 9/52* (2013.01); *G06F 9/455* (2013.01); *G06F 9/45558* (2013.01); *G06F 9/4881* (2013.01); *G06F 9/505* (2013.01); *G06T 1/20* (2013.01); *G06F 2009/4557* (2013.01); *G06F 2009/45579* (2013.01)

(58) Field of Classification Search
CPC .... G06F 9/4881; G06F 9/455; G06F 9/45558; G06F 9/505; G06F 9/52; G06F 2009/4557; G06F 2009/45579
See application file for complete search history.

(56) References Cited

U.S. PATENT DOCUMENTS 4,874,164 A  10/1989 Miner et al.
8,040,901 B1  10/2011 Kompella et al.
(Continued)

FOREIGN PATENT DOCUMENTS

CN  102148824  8/2011
CN  102541618  7/2012
(Continued)

OTHER PUBLICATIONS

United States Patent and Trademark Office, "Advisory Action," issued in connection with U.S. Appl. No. 14/779,234, dated Apr. 13, 2018, 3 pages.
(Continued)

*Primary Examiner* — Jacob D Dascomb
(74) *Attorney, Agent, or Firm* — Hanley, Flight & Zimmerman, LLC

(57) ABSTRACT

Technologies for scheduling workload submissions for a graphics processing unit (GPU) in a virtualization environment include a GPU scheduler embodied in a computing device. The virtualization environment includes a number of different virtual machines that are configured with a native graphics driver. The GPU scheduler receives GPU commands from the different virtual machines, dynamically selects a scheduling policy, and schedules the GPU commands for processing by the GPU.

21 Claims, 4 Drawing Sheets

(56) References Cited

U.S. PATENT DOCUMENTS

| | | | |
|---|---|---|---|
| 8,341,624 B1 | 12/2012 | Hobbs | |
| 8,803,900 B2* | 8/2014 | Truong | G06T 1/00 |
| | | | 345/558 |
| 9,436,504 B2* | 9/2016 | Durant | G06F 9/4881 |
| 2011/0197151 A1 | 8/2011 | Abdo et al. | |
| 2012/0001925 A1* | 1/2012 | Andonieh | G06F 9/5083 |
| | | | 345/502 |
| 2013/0162661 A1* | 6/2013 | Bolz | G06T 1/20 |
| | | | 345/522 |
| 2014/0002730 A1* | 1/2014 | Thomson | G06F 1/3265 |
| | | | 348/441 |
| 2014/0055466 A1 | 2/2014 | Petrov et al. | |
| 2014/0259016 A1 | 9/2014 | Lottes et al. | |
| 2015/0371354 A1 | 12/2015 | Petersen et al. | |
| 2017/0123849 A1 | 5/2017 | Tian et al. | |

FOREIGN PATENT DOCUMENTS

| | | |
|---|---|---|
| CN | 102546379 | 7/2012 |
| CN | 102725736 | 10/2012 |
| CN | 103164283 | 6/2013 |
| CN | 103383644 | 11/2013 |

OTHER PUBLICATIONS

United States Patent and Trademark Office, "Final Office Action," issued in connection with U.S. Appl. No. 14/779,234, dated Nov. 28, 2017, 15 pages.

United States Patent and Trademark Office, "Non-Final Office Action," issued in connection with U.S. Appl. No. 14/779,234, dated Jun. 2, 2017, 15 pages.

United States Patent and Trademark Office, "Notice of Allowance," issued in connection with U.S. Appl. No. 14/779,234, dated Jul. 11, 2018, 12 pages.

Patent Cooperation Treaty,"International Preliminary Report on Patentability," issued in connection with International Patent Application No. PCT/CN2014/080814, dated Jun. 26, 2014, 5 pages.

Patent Cooperation Treaty,"International Search Report," issued in connection with International Patent Application No. PCT/CN2014/080814, dated Jun. 26, 2014, 3 pages.

International Searching Authority, "Written Opinion of the International Searching Authority," issued in connection with International Patent Application No. PCT/US2014/080814, dated Mar. 27, 2015, 4 pages.

European Patent Office, "Examination Report," issued in connection with European Patent No. 14895570.1, dated Apr. 4, 2019, 6 pages.

Tian et al., "A Full GPU Virtualization Solution with Mediated Pass-Through," [https://www.usenix.org/conference/atc14/technical-sessions/presentationitian], Proceedings of USENIX ATC' 14: 2014 USENIX Annual Technical Conference, Jun. 19-20, 2014, 13 pages.

Japanese Patent Office,"Notice for Reasons for Refusal," issued in connection with Japanese Patent Application No. 2016-574043, dated Jan. 26, 2018, 24 pages.

The State Intellectual Property Office of China, "First Office Action," issued in connection with Chinese Patent Application No. 201480079240.3, dated Oct. 21, 2019, 11 pages.

European Patent Office, "Intention to Grant," issued in connection with European Patent Application No. 14895570.1, dated Oct. 21, 2020, 33 pages.

* cited by examiner

INTELLIGENT GPU SCHEDULING IN A VIRTUALIZATION ENVIRONMENT

CROSS-REFERENCE TO RELATED APPLICATIONS

The present application is a continuation of U.S. patent application Ser. No. 14/779,234, filed Sep. 22, 2015.

BACKGROUND

In computing devices, graphics processing units (GPUs) can supplement the central processing unit (CPU) by providing electronic circuitry that can perform mathematical operations rapidly. To do this, GPUs utilize extensive parallelism and many concurrent threads. The capabilities of GPUs make them useful to accelerate the processing of visual media and parallel computing tasks. For instance, a GPU can be used for video encoding/decoding, graphics rendering in two and three-dimensional games, and other general purpose computing applications. If the complexities involved in virtualizing GPUs can be overcome, virtualization technologies can be applied to graphics processing units on many different types of computing platforms.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
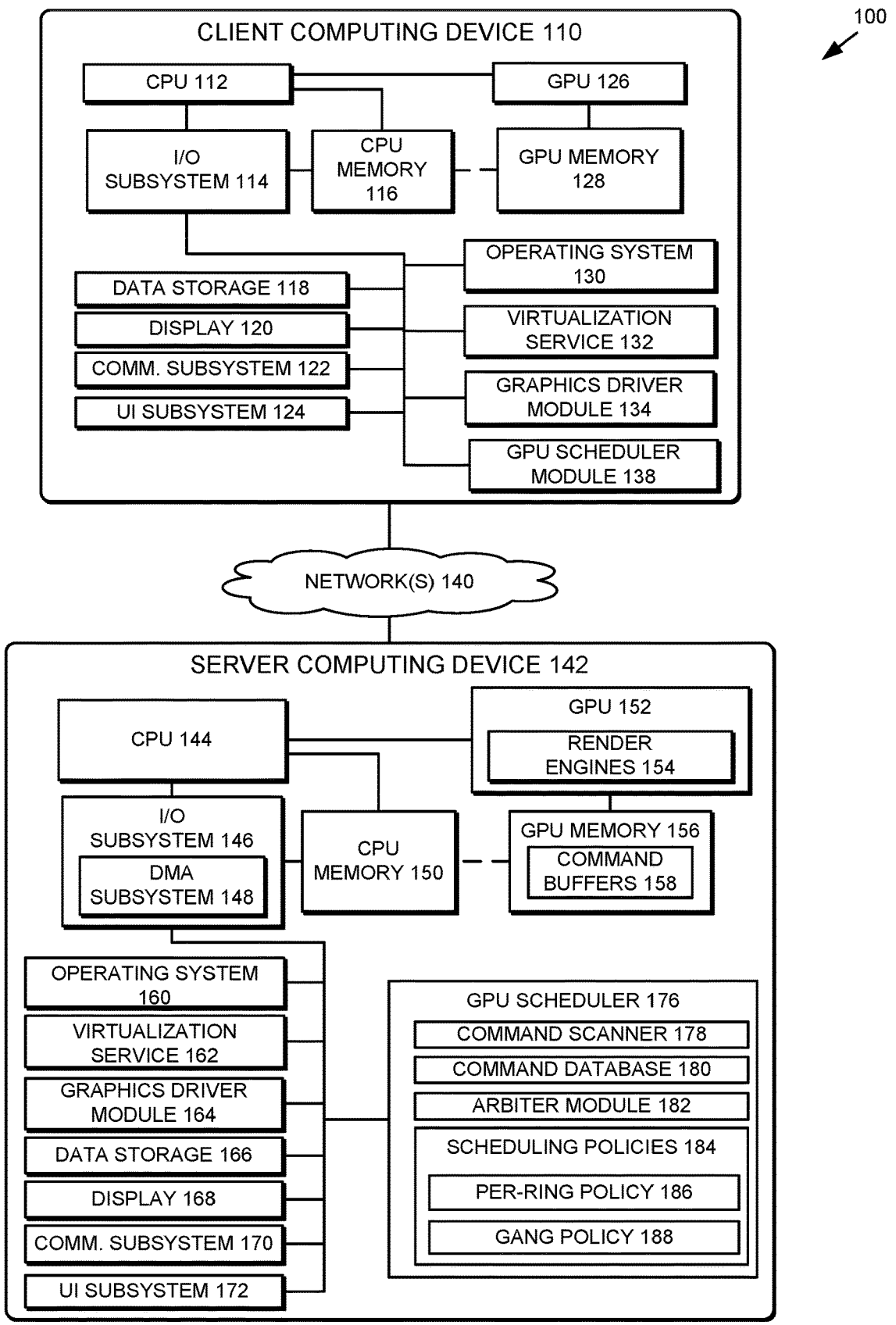
FIG. 1 is a simplified block diagram of at least one embodiment of a computing system including at least one computing device configured with intelligent GPU scheduling as disclosed herein.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an embodiment of a computing system 100 includes a client computing device 110 and a server computing device 142. The client computing device 110 and the server computing device 142 are communicatively coupled to one or more networks 140. Either or both of the client computing device 110 and the server computing device 142 may be configured to utilize the technologies disclosed herein. As such, either or both of the client computing device 110 and the server computing device 142 may be equipped with a graphics processing unit 126, 152 and a virtualization service 132, 162 that can provide GPU virtualization including a GPU scheduler module 138, 176. For ease of discussion, "graphics processing unit" or "GPU" may be used herein to refer to, among other things, a graphics processing unit, graphics accelerator, or other type of specialized electronic circuit or device, such as a general purpose GPU (GPGPU), a visual processing unit, an accelerated processing unit (APU), a field-programmable gate array (FPGA), or any other device or circuit that can be used by the computing device 110, 142 to accelerate graphics tasks and/or other computing operations that would benefit from accelerated processing. The illustrative virtualization service 132, 162 is configured to establish a virtualization environment for the GPU 126, 152 that includes multiple different virtual machines (VMs), such that a native graphics driver runs inside each VM.

The illustrative GPU scheduler module 138, 176 handles the scheduling of certain types of GPU commands that are issued by the different VMs for execution on the GPU hardware (GPU 126, GPU 152). For example, the GPU scheduler module 138, 176 may handle the scheduling of privileged commands while the native graphics drivers in the VMs can directly access performance critical resources, such as frame buffers and command buffers, of the GPU 126, 152. As described in more detail below, the GPU scheduler module 138, 176 dynamically selects a scheduling policy from a number of possible scheduling policies, based on one or more attributes of the GPU commands, GPU command buffer dependencies, and/or other decision criteria, and schedules the GPU commands according to the dynamically-selected scheduling policy. In this way, the GPU scheduler module 138, 176 can, among other things, intelligently change the scheduling policy applicable to one or more of the VMs and/or GPU commands, to achieve greater efficiency or for other reasons. As an example, the GPU scheduler module 138, 176 can implement a per-buffer scheduling policy (e.g., a "per ring" policy for ring buffers) rather than a gang scheduling policy when different VMs are running different types of GPU workloads (e.g., a 3D task on one VM and a video encoding task on another VM), in order to improve performance or for other reasons. As used herein, "workload" may refer to, among other things, a set of GPU commands, which may include one or more GPU commands. Further, the GPU scheduler module 138, 176 can switch to a gang scheduling policy on demand, so as to provide cross-buffer synchronization in order to avoid a dead-lock situation, or for other reasons.

Referring now in more detail to the client computing device 110, the illustrative client computing device 110 includes a central processing unit (CPU) 112 and a graphics processing unit 126. The CPU submits workloads including GPU commands to the GPU 126, typically by direct memory access between a CPU memory 116 and a GPU memory 128. The client computing device 110 may be embodied as any type of device for performing the functions described herein. For example, the client computing device 110 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the client computing device 110 further includes an input/output subsystem 114, a data storage device 118, a display 120, a communication subsystem 122, a user interface subsystem 124, an operating system 130, the virtualization service 132, a graphics driver 134, and the GPU scheduler module 138. The client computing device 110 further includes the GPU 126 and the GPU memory 128. The client computing device 110 may include other or additional components, such as those commonly found in a mobile and/or stationary computers (e.g., various sensors and input/output devices), in other embodiments. Additionally, in some embodiments, one or more of the illustrative components may be incorporated in, or otherwise form a portion of, another component. For example, the CPU memory 116, or portions thereof, may be incorporated in the CPU 112 and/or the GPU memory 128 may be incorporated in the GPU 126, in some embodiments. The components of the client computing device 110 may be embodied as software, firmware, hardware, or a combination of software and hardware.

The CPU 112 may be embodied as any type of processor capable of performing the functions described herein. For example, the CPU 112 may be embodied as a single or multi-core processor(s), digital signal processor, microcontroller, or other processor or processing/controlling circuit. The GPU 126 may be embodied as any type of graphics processing unit capable of performing the functions described herein. For example, the GPU 126 may be embodied as a single or multi-core processor(s), digital signal processor, microcontroller, floating-point accelerator, co-processor, or other processor or processing/controlling circuit designed to rapidly manipulate and alter data in memory. To simplify the drawings and description, some aspects of the client computing device 110 are shown and described in greater detail with reference to the server computing device 142 described below. For example, aspects of the GPU 126, GPU memory 128, and GPU scheduler module 138 are described in more detail below with reference to the corresponding components of the server computing device 142. In general, the description of components of one of the computing devices 110, 142 applies equally to similar components of the other computing device 110, 142.

The CPU memory 116 and the GPU memory 128 of the client computing device 110 may each be embodied as any type of volatile or non-volatile memory or data storage capable of performing the functions described herein. In operation, the memory 116 may store various data and software used during operation of the computing device 110, such as operating systems, applications, programs, libraries, and drivers. For example, portions of the CPU memory 116 at least temporarily store command buffers and GPU commands that are created by the CPU 112, and portions of the GPU memory 128 at least temporarily store the GPU commands received from the CPU memory 116 by, e.g., direct memory access.

The CPU memory 116 is communicatively coupled to the CPU 112, e.g., via the I/O subsystem 114, and the GPU memory 128 is similarly communicatively coupled to the GPU 126. The I/O subsystem 114 may be embodied as circuitry and/or components to facilitate input/output operations with the CPU 112, the CPU memory 116, the GPU 126, the GPU memory 128, and other components of the client computing device 110. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the CPU 112, the CPU memory 116, the GPU 126, the GPU memory 128, and/or other components of the computing device 110, on a single integrated circuit chip.

The data storage device 118 may be embodied as any type of device or devices configured for short-term or long-term storage of data such as, for example, memory devices and circuits, memory cards, hard disk drives, solid-state drives, or other data storage devices. The data storage device 118 may include a system partition that stores data and firmware code for the computing device 110. The data storage device 118 may also include an operating system partition that stores data files and executables for an operating system 130 of the computing device 110.

The display 120 may be embodied as any type of display capable of displaying digital information such as a liquid crystal display (LCD), a light emitting diode (LED), a plasma display, a cathode ray tube (CRT), or other type of display device. In some embodiments, the display 120 may be coupled to a touch screen or other user input device to allow user interaction with the computing device 110. The display 120 may be part of a user interface subsystem 124. The user interface subsystem 124 may include a number of additional devices to facilitate user interaction with the computing device 110, including physical or virtual control buttons or keys, a microphone, a speaker, a unidirectional or bidirectional still and/or video camera, and/or others. The user interface subsystem 124 may also include devices, such as motion sensors, proximity sensors, and eye tracking devices, which may be configured to detect, capture, and process various other forms of human interactions involving the computing device 110.

The computing device 110 further includes a communication subsystem 122, which may be embodied as any communication circuit, device, or collection thereof, capable of enabling communications between the computing device 110 and other electronic devices. The communication subsystem 122 may be configured to use any one or more communication technology (e.g., wireless or wired communications) and associated protocols (e.g., Ethernet, Bluetooth®, Wi-Fi®, WiMAX, 3G/LTE, etc.) to effect such communication. The communication subsystem 122 may be embodied as a network adapter, including a wireless network adapter.

The illustrative computing device 110 also includes a number of computer program components, such as a virtualization service 132, a graphics driver 134, the operating system 130, and the GPU scheduler module 138. Among other things, the operating system 130 facilitates the communication between computer applications, such as the GPU scheduler module 138 and the virtualization service 132, and the hardware components of the computing device 110. The operating system 130 may be embodied as any operating system capable of performing the functions described herein, such as a version of WINDOWS by Microsoft Corporation, ANDROID by Google, Inc., and/or others. As used herein, a "computer application" may refer to, among other things, "user space" software and/or hardware applications through which end users may interact with the computing device 110, and/or "system space" hardware and/or software applications in which programming code can interact directly with hardware components of the computing device 110. System space components of the computing device 110 may have greater privileges than user space components of the computing device 110.

In the illustrative embodiment, the graphics driver 134 handles communications between computer applications and hardware components, such as the display 120. In some embodiments, the graphics driver 134 may include a "general-purpose" driver that can, for example, communicate device-independent graphics rendering tasks to a variety of different hardware components (e.g., different types of displays), and a "device specific" driver that translates the device-independent tasks into commands that a specific hardware component can execute to accomplish the requested task. In other embodiments, portions of the general purpose and device-specific drivers may be combined into a single driver component (e.g., the graphics driver 134). Portions of the graphics driver 134 may be included in the operating system 130, in some embodiments. The graphics driver 134 is, illustratively, a display driver; however, aspects of the disclosed GPU scheduler module 138 may be used in other applications, e.g., any kind of task that may be offloaded to the GPU 126 (e.g., where the GPU 126 is configured as a GPGPU).

The illustrative virtualization service 132 is embodied as a type of hypervisor, which may be launched by a bootloader directly from the firmware or by the operating system 130. The virtualization service 132 may be embodied as a "thin" hypervisor or a more traditional hypervisor, virtual machine manager (VMM), or similar virtualization platform. For example, the virtualization service 132 may be embodied as a XEN-based (type-I) VMM, a kernel-based virtual machine (KVM)-based (type-II) VMM, or a WINDOWS-based VMM. In some embodiments, the virtualization service 132 may be embodied as a "bare metal" hypervisor, which can execute directly from the system hardware. The virtualization service 132 is embodied as a privileged software or firmware component that facilitates and manages the virtualization of shared resources of the computing device 110, in particular the GPU 126. As such, the virtualization service 132 executes in a higher-privileged system mode of the computing device 110 in which virtualization service 132 may have substantially full control of the GPU 126 and/or other hardware resources of the computing device 110. As noted above, the virtualization service 132 can establish a virtualization environment for the GPU 126 that includes multiple virtual machines, with each virtual machine running its own instance of the graphics driver 134. Illustrative examples of GPU virtualization services include XenGT by Intel Corp. and GRID VGZ by nVidia Corp. The GPU scheduler module 138 may be embodied as a component of the virtualization service 132. In operation, the GPU scheduler module 138 communicates with the virtual instances of the graphics driver 134 in the VMs to control the submission of GPU commands to the GPU 126 as described below.

Referring now in more detail to the server computing device 142, the server computing device 142 may be embodied as any type of device for performing the functions described herein. For example, the server computing device 142 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. Components of the server computing device 142 having the same or similar names to above-described components of the client computing device 110 may be embodied similarly, and accordingly, the description is not repeated here. Further, it should be understood that client computing device 110 may include any of the components of the server computing device 142 and the description of such components below applies equally to similar components of the client computing device 110.

The illustrative server computing device 142 includes a CPU 144, an input/output subsystem 146, a direct memory access (DMA) subsystem 148, a CPU memory 150, an operating system 160, a virtualization service 162, a graphics driver module 164, a data storage device 166, a display 168, a communication subsystem 170, a user interface subsystem 172, and the GPU scheduler module 176. The server computing device 142 further includes the GPU 152, render engines 154, the GPU memory 156, and command buffers 158. The server computing device 142 may include other or additional components, such as those commonly found in a mobile and/or stationary computers (e.g., various sensors and input/output devices), in other embodiments. Additionally, in some embodiments, one or more of the illustrative components may be incorporated in, or otherwise form a portion of, another component. The components of the server computing device 142 may be embodied as software, firmware, hardware, or a combination of software and hardware.

The GPU 152 includes a number of render engines 154, which may be embodied as hardware execution units of the GPU 152, e.g., an array of processor cores or parallel processors, each of which can execute a number of parallel threads. The GPU 152 may be embodied as a peripheral device (e.g., on a discrete graphics card), or may be located on the CPU motherboard or on the CPU die. The render engines 154 may each be configured to handle a specific type of GPU task. For example, in some embodiments, multiple different render engines 154 may be configured to individually handle 3D rendering tasks, blitter (e.g. 2D graphics), video, and video encoding/decoding tasks.

Portions of the CPU memory 150 may at least temporarily store command buffers and GPU commands that are created by the CPU 144, and portions of the GPU memory 156 at least temporarily store the GPU commands in command buffers 158. The GPU commands are transferred by the CPU 144 to the command buffers 158 by the direct memory access subsystem 148. The direct memory access (DMA) subsystem 148 facilitates data transfer between the CPU memory 150 and the GPU memory 156. In some embodiments, the DMA subsystem 148 allows the GPU 152 to directly access the CPU memory 150 and allows the CPU 144 to directly access the GPU memory 156. The DMA subsystem 148 may be embodied as a DMA controller or DMA "engine," such as a Peripheral Component Interconnect (PCI) device, a Peripheral Component Interconnect-Express (PCI-Express) device, an I/O Acceleration Technology (I/OAT) device, and/or others.

The illustrative command buffers 158 are embodied as ring buffers, and each of the ring buffers may chain many batch buffers together. In some embodiments, the computing device 142 implements a different command buffer for each of the render engines 154 (e.g., separate ring buffers for each of the 3D, blitter, video, and video encoding/decoding engines 154). A ring buffer is a type of first-in/first-out (FIFO) data structure that can be useful for, e.g., asynchronous input-output operations. Other types of FIFO data structures, or other suitable types of data structures, may be used in other embodiments.

Through the virtualization service 162, the command buffers 158 are virtualized so that each VM established by the virtualization service 162 includes a set of the command buffers 158 (e.g., 3D, blitter, video, and video encoding/decoding command buffers in each VM), each of which is parsed by a different command parser (e.g., 3D, blitter, video, and video encoding/decoding command parsers) in parallel. The GPU scheduler module 176 may conduct a context switch when a new VM is scheduled for access to the GPU 152. In response to the context switch, the GPU 152 may serve a different set of command buffers (e.g., the command buffers associated with the new VM).

The illustrative GPU scheduler module 176 includes a command scanner module 178, a command database 180, an arbiter module 182, and a number of scheduling policies 184. The GPU scheduler module 176, the command scanner module 178, the command database 180, and the arbiter module 182 may be implemented as any type of processor-executable code, module(s) and/or data structures, or combination thereof. Aspects of the command scanner module 178, command database 180, and arbiter module 182 are described in more detail below with reference to FIG. 3.

Illustratively, the scheduling policies 184 include a per-ring scheduling policy 186 and a gang scheduling policy 188. The per-ring scheduling policy 186 may allow ring buffers to be context-switched independently of one another, thereby allowing GPU commands from different VMs to be scheduled at the same time if they will utilize different render engines 154. However, use of a per-ring scheduling policy can lead to a dead-lock issue if two GPU commands on different buffers each depend on a condition signaled by the other command, or if two commands on different buffers depend on the same condition being satisfied. The dependency of one command on one ring buffer of a VM on a result signaled by another command on another ring buffer of the same VM may be evidenced by the presence of a synchronization or "wait" command in the command buffer along with a condition upon which the wait command depends. This type of command dependency may be referred to as "cross-ring synchronization" or more generally as a cross-buffer dependency or cross-buffer synchronization (of GPU commands on different buffers of the same VM).

As an example, suppose the per-ring scheduling policy 186 receives and schedules a GPU workload from a 3D ring buffer of a first virtual machine, VM1, for execution by a 3D engine 154. The per-ring scheduling policy 186 also receives a GPU workload from a blitter ring buffer of another virtual machine, VM2. According to the per-ring scheduling policy, the VM2 blitter task can be scheduled on the blitter engine 154 because the blitter engine 154 is not in use by VM1. The VM1 3D workload includes a number of GPU commands relating to a 3D rendering task, but the 3D rendering task has to be synchronized with another VM1 task that needs to be scheduled on the blitter engine 154. This may be evidenced by a wait command in the VM1 3D workload, where the wait command is dependent on a condition value COND1. The value COND1 is signaled by the VM1 blitter task. However, the VM1 blitter workload also includes a wait command, which is dependent on a condition value COND2, but COND2 is signaled by the VM1 3D task. The VM1 blitter task has to wait to be scheduled until the VM2 blitter task finishes. The VM1 3D task cannot complete until the VM1 blitter task signals COND1, and the VM1 blitter task cannot complete until the VM1 3D task signals COND2. Because, according to the per-ring scheduling policy 186, the two VM1 tasks are scheduled at different times (e.g., due to the fact that the per-ring policy has allowed the VM2 blitter command to be scheduled because the blitter engine 154 is available), a dead-lock situation results, in which the processing by the GPU 152 will simply hang. Even if the GPU 152 is configured with command preemption support, where a wait command can be preempted after some timeout period, the wait command in VM1 may be incorrectly completed due to the COND value signaled from VM2, if two different commands happen to use the same COND value.

The gang scheduling policy 188 may require that all of the ring buffers in a VM be context-switched together rather than independently as with the per-ring scheduling policy 186. The gang scheduling policy 188 can be used to overcome cross-ring synchronization issues. Continuing the example above, suppose that the gang scheduling policy 188 is used instead of the per-ring scheduling policy 186. In this case, the gang scheduling policy 188 schedules the VM1 3D commands and the VM1 blitter commands together (on the 3D and blitter engines 154, respectively). When the VM1 blitter command signals COND1, the VM1 3D command can continue. When the VM1 3D command signals COND2, the VM1 blitter command can continue. Commands from VM2 have to wait for all of the VM1 commands from all of the VM1 ring buffers to finish before they can be scheduled.

The gang scheduling policy 188 can be inefficient in GPU virtualization, however. For example, suppose that the GPU scheduler module 176 schedules a VM1 workload to run on the 3D engine 154, and there are no other workloads on any of the other VM1 buffers. Even though the video engine 154 (for example) is not in use by VM1 (because there are no GPU commands in the VM1 video buffer), according to the gang scheduling policy 188, the video engine 154 cannot be used to run a VM2 video task until the VM1 3D task is complete.

Figure 2:
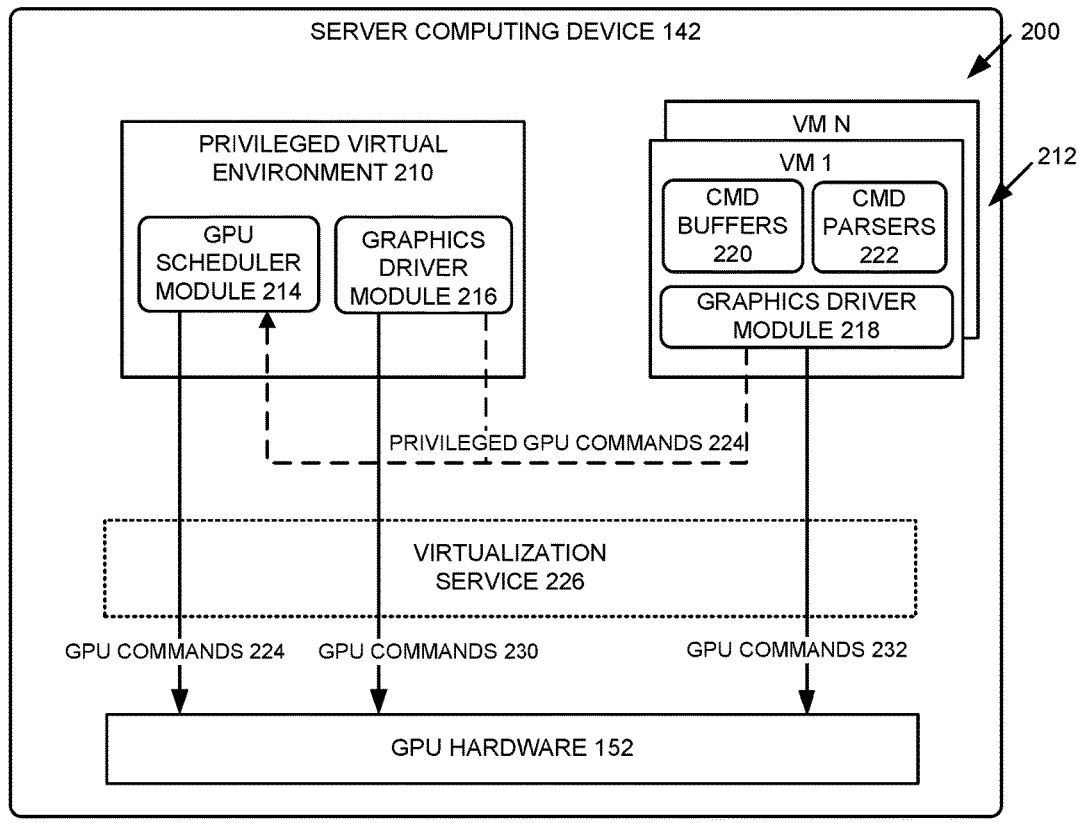
FIG. 2 is a simplified block diagram of at least one embodiment of an environment of the server computing device of FIG. 1.

Referring now to FIG. 2, in some embodiments, the server computing device 142 establishes an environment 200 during operation. The environment 200 includes a privileged virtual environment 210, a GPU scheduler module 214, a graphics driver module 216, command buffers 220, command parsers 222, graphics driver modules 218, a virtualization service 226, and the GPU hardware 152. The various modules of the environment 200 may be embodied as hardware, firmware, software, or a combination thereof. The illustrative environment 200 includes an executing instance (virtualization service 226) of the virtualization service 162, which establishes a privileged virtual environment 210 and "N" virtual machines 212 (where N is a positive integer). The privileged virtual environment (which may be referred to as "domain 0" in some implementations) includes an executing instance (GPU scheduler module 214) of the GPU scheduler module 176 and an executing instance (graphics driver module 216) of the graphics driver module 164. Each of the VMs 212 includes an executing instance (graphics driver module 218) of the graphics driver module 164, an instance (command buffer 220) of each the command buffers 158, and command parsers 222. The command buffers 220 of each VM include, for example, 3D, blitter, video, and video encoding/decoding ring buffers. The graphics driver modules 216, 218 may each submit non-privileged commands 230, 232 directly to the GPU hardware 152. Privileged GPU commands 224 are handled by the GPU scheduler module 214 (e.g., by a trap-and-emulation technique), and submitted to the GPU 152 using a dynamic hybrid scheduling approach as described herein.

The GPU scheduler module 214 evaluates the GPU commands of all of the command buffers of all of the VMs, and, in response to output of the evaluating of the GPU commands, dynamically selects a scheduling policy from a number of different scheduling policies. The GPU scheduler module 214 schedules at least one of the GPU commands for processing by the GPU according to the dynamically selected scheduling policy. Some examples of "dynamic" and/or "hybrid" scheduling performed by the GPU scheduler module 214 follow. The GPU scheduler module 214 may schedule the GPU commands of two different VMs according to two different scheduling policies. The GPU scheduler module 214 may switch the scheduling policy applicable to one or more VMs from a per-ring scheduling policy to a gang scheduling policy, e.g., in response to detecting a cross-buffer dependency between two GPU commands in different command buffers of the same virtual machine. After switching from a per-ring scheduling policy to a gang scheduling policy for one VM, the GPU scheduler module 214 may evaluate a GPU command of a different VM and schedule the GPU command of the different VM according to a different scheduling policy (e.g., the GPU scheduler module 214 may switch back to a per-ring scheduling policy for the different VM, thus running a gang scheduling policy in one VM and a per-ring scheduling policy in another VM, at the same time). In some embodiments, the GPU scheduler may keep track of occurrences of cross-buffer dependencies across all of the command buffers of all of the virtual machines, and change the scheduling policy (e.g., from a per-ring policy to a gang policy or vice versa) if no cross-buffer dependencies are detected in a certain number of command buffers or over a certain period of time, or more generally, based on the frequency of occurrence of the cross-buffer dependencies. The various modules and components of the environment 200 (e.g., the GPU scheduler module 214) may be embodied as hardware, firmware, software, or a combination thereof. Additionally, in some embodiments, some or all of the modules of the environment 200 may be integrated with, or form part of, other modules or software/firmware structures.

To trigger the operation of the GPU scheduler module 214, in some embodiments, the graphics driver module 216, 218 queues the GPU commands 224 into the command buffers 220 and then writes a memory mapped input-output (MMIO) register (tail) to initiate parsing of the queued commands by the command parsers 222. In a virtual environment (e.g., the environment 200), the last MMIO write is trapped, so that the GPU scheduler module 214 can perform scheduling of the VMs' GPU commands.

Figure 3:
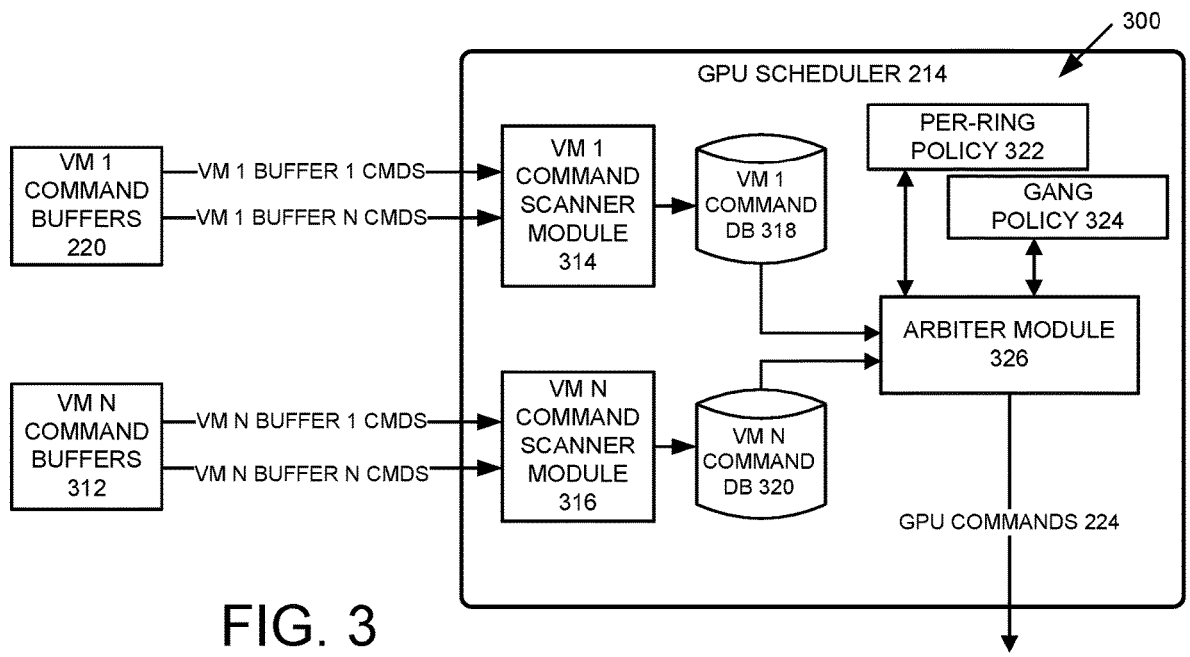
FIG. 3 is a simplified block diagram of at least one embodiment of an environment of the GPU scheduler of FIG. 2.

Referring now to FIG. 3, in some embodiments, the server computing device 142 establishes an environment 300 during operation. The environment 300 includes the GPU scheduler module 214, command scanner modules 314, 316, command databases 318, 320, a per-ring scheduling policy 322, a gang scheduling policy 324, and an arbiter module 326. The various modules of the environment 300 may be embodied as hardware, firmware, software, or a combination thereof. The illustrative environment 300 includes executing instances (command scanner modules 314, 316) of the command scanner module 178 (e.g., one instance per VM), instances of command databases 318, 320 (e.g., one database per VM), an executing instance (arbiter module 326) of the arbiter module 182, an instance (per-ring scheduling policy 322) of the per-ring scheduling policy 186, and an instance (gang scheduling policy 324) of the gang scheduling policy 188. Each of the command scanner modules 314, 316 scans the queued GPU commands of all of the command buffers of its respective VM. For example, the VM1 command scanner module 314 scans the GPU commands contained in the VM1 command buffers 220 (which include, for example, a number of ring buffers, such as 3D, blitter, video, and video encoding/decoding buffers, for VM1). Similarly, the VM N command scanner module 316 scans the GPU commands contained in the VM N command buffers 312 (which include, for example, a number of ring buffers, such as 3D, blitter, video, and video encoding/decoding buffers, for VM N).

Each command scanner module 314, 316 generates data indicative of cross-buffer dependencies between GPU commands in different command buffers of the same virtual machine, creates the command database 318, 320, and stores the data indicative of cross-buffer dependencies in the command database 318, 320. That is, each command scanner module 314, 316 identifies cross-buffer dependencies in the GPU commands of its respective VM and stores data indicating the dependencies in the command database 318, 320 for its respective VM. The command scanner module 314, 316 may determine a command type for each of the GPU commands of the VM and store data indicating the command type in the command database 318, 320, as well. The command type may correspond to the type of task to be performed by the GPU 152 or the particular render engine 154 to perform the task, e.g., 3D, blitter, video, video encoding/decoding).

The command scanner module 314, 316 may associate a flag with a specific workload submission if the command scanner module 314, 316 determines that the submission includes a cross-buffer dependency. To do this, the command scanner may perform in-place instrumentation of the set of GPU commands. Where the command buffers 220, 312 are embodied as ring buffers, the command scanner module 314, 316 may identify cross-ring synchronization primitives and store data relating to the presence or absence of cross-ring synchronization primitives in the command database 318, 320. For instance, the command scanner module 314, 316 may determine whether any cross-ring synchronization primitives exist, and if any cross-ring synchronization primitives exist, set a flag (e.g., REQ_GANG) for the associated command buffer 220, 312. The arbiter module 326 can then check the flag and if the flag is set validly (e.g., to REQ_GANG=YES), then the arbiter module 326 initiates a switch from the per-ring scheduling policy 322 to the gang scheduling policy 324. To switch back to the per-ring scheduling policy 322 from the gang scheduling policy 324, the arbiter module 326 may utilize an empirical policy such as: if no cross-ring synchronization primitives are detected in the next N command buffers, in all of the VMs, then switch back to the per-ring scheduling policy 322. As used herein, a "primitive" may refer to, among other things, a simple software mechanism that is provided by the computing platform (e.g., the operating system), and may include lower level mechanisms (e.g. atomic operations, memory barriers, spinlocks, context switches, etc.). As an example, semaphore commands (e.g., a semaphore "wait" command) may be provided by a computing platform in order to serialize cross-ring execution for objects that are shared by multiple ring buffers.

In some embodiments, the command scanner module 314, 316 may build direct dependencies among the different command buffers of its respective VM. To do this, the command scanner module 314, 316 may populate a graph data structure in the VM's command database 318, 320 with dependency and command type information. Code Examples 1 and 2 below shows examples of pseudo code for graph data structures that may be created by the command scanner modules 314, 316 for a VM1 and a VM2 and stored in the command databases 318, 320 for the VM1 and the VM2.

[Buf11, 3D ring, wait for [Buf12, blitter ring, COND1]

[Buf12, blitter ring], signal [Buf11, 3D ring, COND1]

[Buf13, 3D ring], no dependency

[Buf14, blitter ring], no dependency

Code Example 1. Command Database for a VM1

In Code Example 1, the Buf11, Buf12, Buf13, Buf14 are four ring buffers of VM1. Code Example 1 specifies the buffer type or command type (e.g., 3D, blitter) that is governed by the dependency information that follows (if any). For instance, 3D commands in Buf11 have a dependency on blitter commands in Buf12 in that they need to wait for the blitter commands in Buf12 to signal COND1. In Code Example 1, Buf13 and Buf14 are identified as having no dependencies.

[Buf21, video ring], no dependency

[Buf22, video ring], no dependency

Code Example 2. Command Database for a VM1

In Code Example 2, Buf21 and Buf22 are two buffers of VM2. Code Example 2 illustrates that dependency information can be constructed by the command scanner modules 314, 316 at a highly granular level. For instance, some buffers can be co-scheduled while other buffers are per-ring scheduled. In this way, the command scanner modules 314, 316 can enable mode-flexible scheduling policies. As an example, if VM1 submits command buffers that only have 3D/blitter dependencies, but VM2 submits command buffers with video workloads, the GPU scheduler module 214 can co-schedule the 3D/blitter buffers to VM1 using a gang scheduling policy while using a per-ring scheduling policy to schedule the video workloads of VM2.

In some embodiments, the command scanner module 314, 316 may introduce a threshold test or value in the command databases 318, 320, to further control the policy switching based on current buffer activity. For example, if cross-ring synchronization primitives are observed frequently (e.g., in many command buffers or many observations over a period of time), this may be an indication that the native graphics driver 134 is designed to use those primitives in the normal course. As a result, the command scanner module 314, 316 can utilize a threshold value to prevent the gang scheduling policy 188 from being implemented until after the threshold value (e.g., the number of synchronization primitives detected) has been reached or exceeded.

The arbiter module 326 evaluates the command databases of all of the virtual machines and selects a scheduling policy for at least one of the virtual machines based on the evaluating of all of the command databases 318, 320. The arbiter module 326 utilizes the command databases 318, 320 and the scheduling policies 322, 324 to dynamically select a scheduling policy for one or more GPU commands and/or VMs. To do this, the arbiter module 326 analyzes the information in the command databases 318, 320 in view of the scheduling policies 322, 324. As a result of this analysis, the arbiter module 326 may initiate a switch from the per-ring scheduling policy 322 to the gang scheduling policy 324 or a switch from the gang scheduling policy 324 to the per-ring scheduling policy 322. In switching from the per-ring scheduling policy 322 to the gang scheduling policy 324, the arbiter module 326 may initiate a rendezvous process to wait for all of the ring buffers to become idle, as needed.

Figure 4:
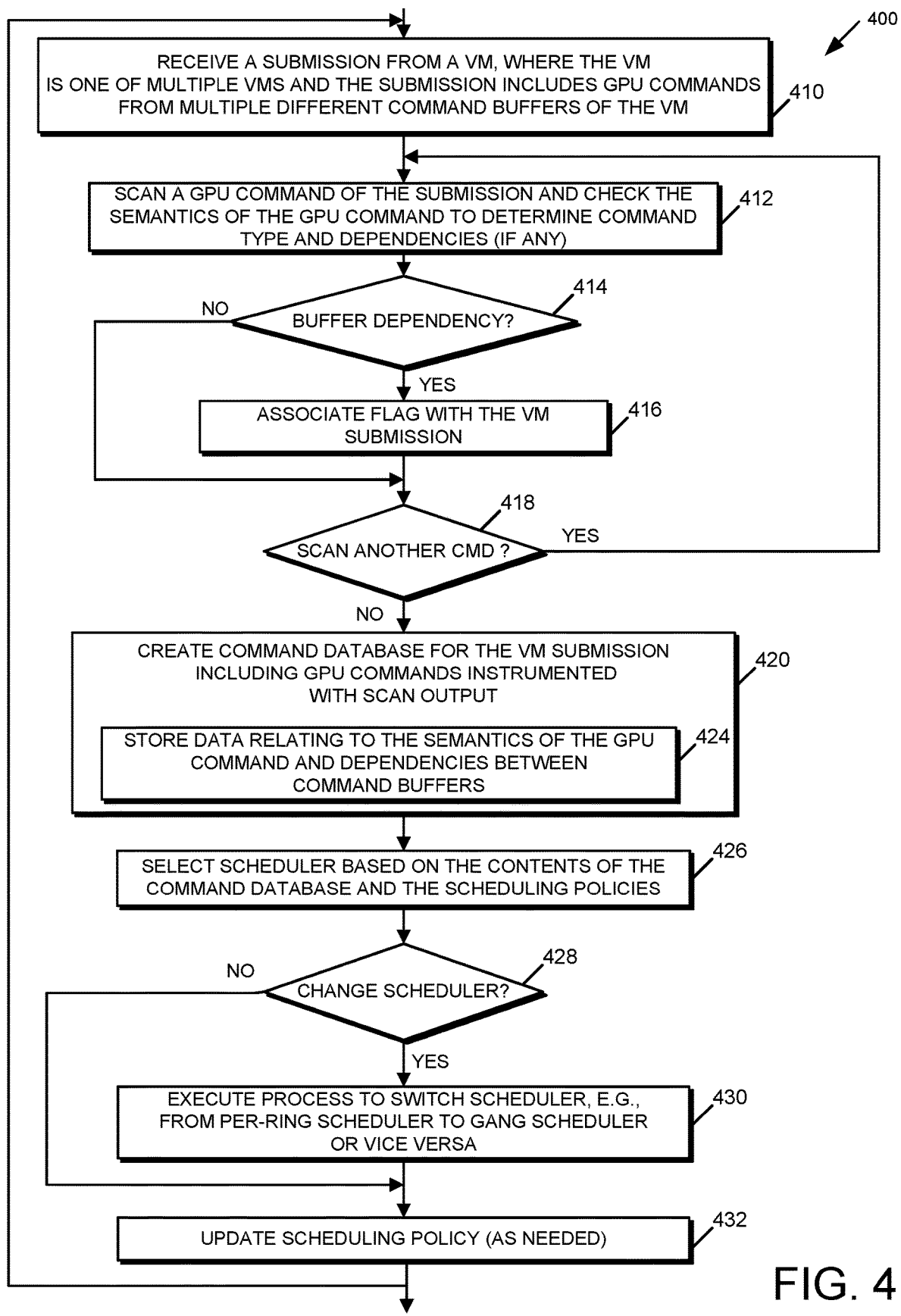
FIG. 4 is a simplified flow diagram of at least one embodiment of a method for intelligent GPU scheduling, which may be executed by one or more of the computing devices of FIG. 1.

Referring now to FIG. 4, an example of a method 400 for dynamically selecting a scheduling policy for a GPU submission is shown. Portions of the method 400 may be executed by hardware, firmware, and/or software of the computing device 110 or the computing device 142; for example, by the CPU 112, 144 and the GPU 126, 152. At block 410, the computing device 110, 142 receives a GPU submission from a VM, where the VM is one of multiple VMs established by a GPU virtualization service of the computing device 110, 142, and the VM has a number of different command buffers and a native graphics driver. The submission includes GPU commands from the different command buffers of the VM. At block 412, the computing device 110, 142 scans a GPU command of the submission. In doing so, the computing device 110, 142 checks the semantics of the GPU command to determine the command type (e.g., which engine 154 should process the command: 3D, blitter, video, or video encoding/decoding) and/or to determine if there are any cross-buffer dependencies (e.g., the existence of any cross-ring synchronization primitives).

At block 414, the computing device 110, 142 identifies the cross-buffer dependencies (if any). If a cross-buffer dependency is identified, at block 416, the computing device 110, 142 associates a flag (e.g., REQ_GANG=YES) with the VM's submission. If a cross-buffer dependency is not identified, the computing device 110, 142 proceeds to scan another GPU command in the submission from the VM, at block 418 (if the submission contains another command to be scanned). If there is another GPU command to be scanned, the computing device 110, 142 returns to block 412. If there are no other GPU commands in the submission that need to be scanned, the computing device 110, 142 proceeds to build a command database for the VM at block 420. The computing device 110, 142 stores the GPU commands instrumented with any cross-buffer dependency information and/or command type information (e.g., the output of the scanning process performed at blocks 412-416) in the command database, at block 424.

At block 426, the computing device 110, 142 selects a scheduling policy based on the information contained in the command database and the available scheduling policies (which include, for example, a per-ring scheduling policy and a gang scheduling policy). To do this, the computing device 110, 142 may execute programming logic (e.g., Boolean logic) to determine whether a condition (such as the presence or absence of a cross-buffer dependency, or the presence or absence of a certain number or frequency of cross-buffer dependencies) has occurred and select the policy based on the occurrence or lack of occurrence of the specified condition. At block 428, the computing device 110, 142 determines whether it needs to change the current scheduling policy. To do this, the computing device 110, 142 may compare the policy selected at block 426 to the policy that is currently in effect, and then if a policy change is needed, initiate the requisite action to implement the new policy (e.g., a rendezvous process as needed), at block 430. At block 432, the computing device 110, 142 may update the current scheduling policy. For example, as noted above, if the computing device 110, 142 notices over a period of time that many cross-buffer dependencies occur, the computing device 110, 142 may update the gang scheduling policy so that it is only implemented after a certain threshold number of cross-buffer dependencies have been detected. The computing device 110, 142 may store the updated policy, e.g., in a data storage device 118, 166.

Figure 5:
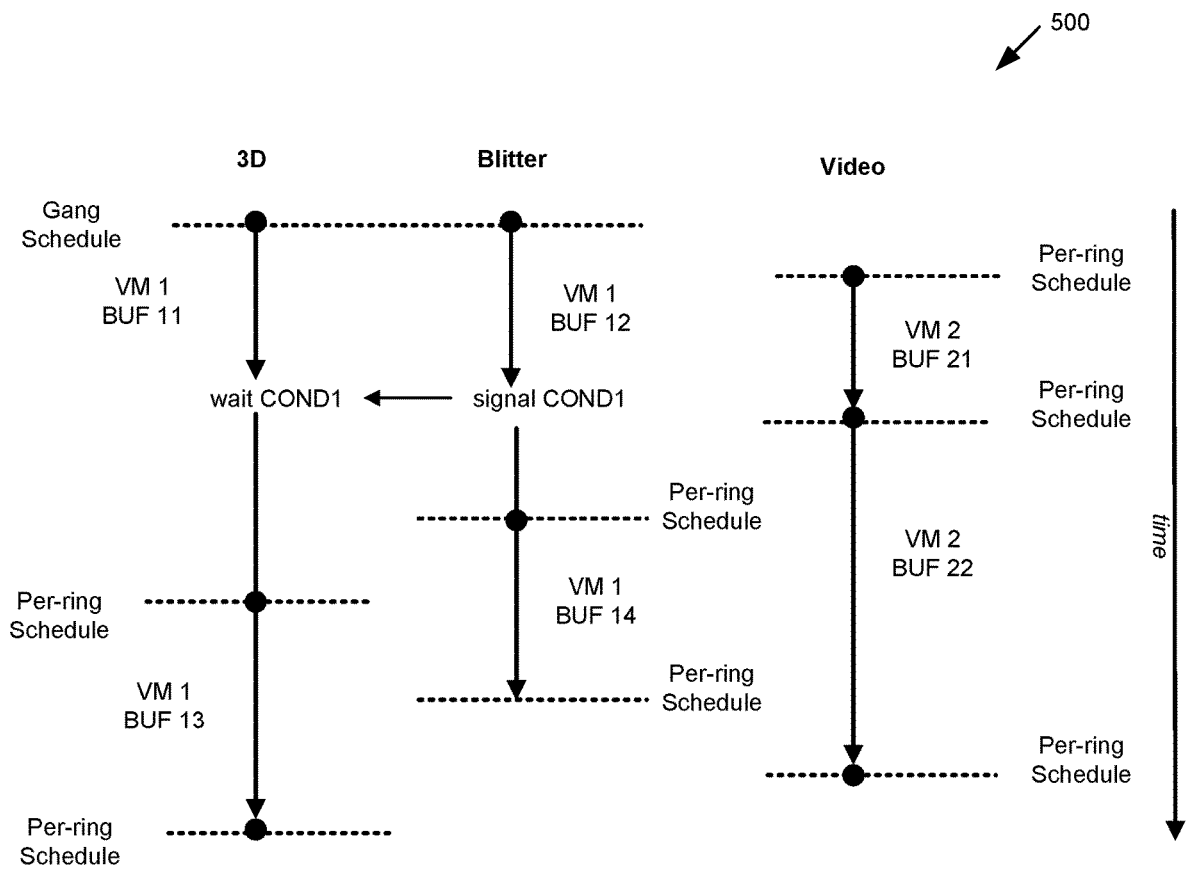
FIG. 5 is a simplified timing diagram illustrating a use case for at least one embodiment of the computing system of FIG. 1.

Referring now to FIG. 5, an example 500 of an implementation of the dynamically selected, hybrid GPU scheduling approach disclosed herein is shown. In the example 500, the computing device 110, 142 has identified a cross-buffer dependency between the VM1 Buf11 (3D) buffer and the VM1 Buf12 (blitter) buffer. The cross-buffer dependency is indicated by the "wait COND1" and "signal COND1" synchronization primitives. As a result, the computing device 110, 142 implements the gang scheduling policy for VM1. However, because the interdependency is only between the 3D and blitter buffers for VM1, and there are no inter-engine dependencies for the video engine 154, the computing device 110, 142 implements per-ring scheduling for the video engine 154. As a result, the VM2 Buf21 and VM2 Buf22 video workloads are processed by the video engine 154 of the GPU 152 while the 3D and blitter engines 154 are processing the VM1 Buf11 and VM1 Buf12 workloads, respectively. Further, once the dependency condition is removed, the computing device 110, 142 returns to per-ring scheduling on the 3D and blitter engines 154. As a result, the VM1 Buf13 and VM1 Buf14 workloads can proceed at the same time on the 3D and blitter engines 154, respectively.

EXAMPLES

Illustrative examples of the technologies disclosed herein are provided below. An embodiment of the technologies may include any one or more, and any combination of, the examples described below.

Example 1 includes a computing device for scheduling workload submissions for a virtualized graphics processing unit (GPU). The computing device includes a virtualization service to establish a virtualization environment including a plurality of virtual machines, where each of the virtual machines includes a graphics driver to communicate with the GPU and a plurality of command buffers to store GPU commands. The computing device also includes a GPU scheduler module to: evaluate the GPU commands of all of the command buffers of all of the virtual machines; dynamically select, in response to the evaluation of the GPU commands, a scheduling policy from a plurality of different scheduling policies; and schedule at least one of the GPU commands for processing by the GPU according to the dynamically selected scheduling policy.

Example 2 includes the subject matter of Example 1, and includes a command scanner module to scan the GPU commands of all of the command buffers of a virtual machine, generate data indicative of cross-buffer dependencies between GPU commands in different command buffers of the same virtual machine, and dynamically select the scheduling policy based on the data indicative of cross-buffer dependencies.

Example 3 includes the subject matter of Example 1 or Example 2, and includes a command scanner module to scan the GPU commands of all of the command buffers of a virtual machine, determine a command type for each of the GPU commands, and dynamically select the scheduling policy for a GPU command based on the command type of the GPU command.

Example 4 includes the subject matter of any of the preceding Examples, wherein the GPU scheduler module is to schedule GPU commands of one of the virtual machines according to the dynamically-selected scheduling policy and schedule GPU commands of another one of the virtual machines according to a different scheduling policy.

Example 5 includes the subject matter of any of the preceding Examples, wherein the GPU scheduler module is to switch the scheduling policy from a per-ring scheduling policy to a gang scheduling policy in response to detecting a cross-buffer dependency between two GPU commands that are in different command buffers of the same virtual machine.

Example 6 includes the subject matter of Example 5, wherein the GPU scheduler module is to evaluate a GPU command of a different virtual machine and schedule the GPU command of the different virtual machine according to a scheduling policy that is not a gang scheduling policy.

Example 7 includes the subject matter of Example 6, wherein the GPU scheduler module is to schedule the GPU command of the different virtual machine according to a per-ring scheduling policy.

Example 8 includes the subject matter of any of Examples 1, 5 or 6, wherein each of the command buffers is embodied as a ring buffer, and the GPU scheduler module is to scan the GPU commands of a virtual machine for cross-ring synchronization primitives and select the scheduling policy for the GPU commands of the virtual machine based on the presence or absence of cross-ring synchronization primitives.

Example 9 includes the subject matter of any of Examples 1, 5 or 6, wherein the GPU scheduler module is to dynamically select different scheduling policies for different virtual machines based on the output of the evaluating of the GPU commands.

Example 10 includes the subject matter of any of Examples 1, 5 or 6, and includes a command scanner module for each of the virtual machines, each command scanner module to create a command database comprising data indicating dependencies between the command buffers of the virtual machine.

Example 11 includes the subject matter of any of Examples 1, 5 or 6, and includes an arbiter module to evaluate the command databases of all of the virtual machines and select the scheduling policy for at least one of the virtual machines based on the evaluating of all of the command databases.

Example 12 includes the subject matter of any of Examples 1, 5 or 6, wherein the GPU scheduler module is to scan the GPU commands of all of the command buffers of a virtual machine, detect cross-buffer dependencies between GPU commands in different command buffers of the same virtual machine, determine a frequency of occurrence of the cross-buffer dependencies over a period of time, and change the scheduling policy based on the frequency of occurrence of the cross-buffer dependencies.

Example 13 includes the subject matter of any of Examples 1, 5 or 6, wherein the GPU scheduler module is to monitor for occurrences of cross-buffer dependencies across all of the command buffers of all of the virtual machines, and change the scheduling policy from a per-ring policy to a gang policy if no cross-buffer dependencies are detected in a selected number of the command buffers.

Example 14 includes a method for scheduling workload submissions for a virtualized graphics processing unit (GPU), including: establishing a virtualization environment comprising a plurality of virtual machines, each of the virtual machines comprising a graphics driver to communicate with the GPU and a plurality of command buffers to store GPU commands; evaluating the GPU commands of all of the command buffers of all of the virtual machines; in response to output of the evaluating of the GPU commands, dynamically selecting a scheduling policy from a plurality of different scheduling policies; and scheduling at least one of the GPU commands for processing by the GPU according to the dynamically selected scheduling policy.

Example 15 includes the subject matter of Example 14, and includes scanning the GPU commands of all of the command buffers of a virtual machine, generating data indicative of cross-buffer dependencies between GPU commands in different command buffers of the same virtual machine, and dynamically selecting the scheduling policy based on the data indicative of cross-buffer dependencies.

Example 16 includes the subject matter of Example 14, and includes scanning the GPU commands of all of the command buffers of a virtual machine, determining a command type for each of the GPU commands, and dynamically selecting the scheduling policy for a GPU command based on the command type of the GPU command.

Example 17 includes the subject matter of Example 14, and includes scheduling GPU commands of one of the virtual machines according to the dynamically-selected scheduling policy and scheduling GPU commands of another one of the virtual machines according to a different scheduling policy.

Example 18 includes the subject matter of Example 14, and includes switching the scheduling policy from a per-ring scheduling policy to a gang scheduling policy in response to detecting a cross-buffer dependency between two GPU commands that are in different command buffers of the same virtual machine.

Example 19 includes the subject matter of Example 18, and includes evaluating a GPU command of a different virtual machine and scheduling the GPU command of the different virtual machine according to a different scheduling policy that is not a gang scheduling policy.

Example 20 includes the subject matter of Example 19, and includes scheduling the GPU command of the different virtual machine according to a per-ring scheduling policy.

Example 21 includes the subject matter of Example 14, wherein each of the command buffers is embodied as a ring buffer, and the method comprises scanning the GPU commands of a virtual machine for cross-ring synchronization primitives and selecting the scheduling policy for the GPU commands of the virtual machine based on the presence or absence of cross-ring synchronization primitives.

Example 22 includes the subject matter of Example 14, and includes dynamically selecting different scheduling policies for different virtual machines based on the output of the evaluating of the GPU commands.

Example 23 includes the subject matter of Example 14, and includes, for each of the virtual machines, creating a command database comprising data indicating dependencies between the command buffers of the virtual machine.

Example 24 includes the subject matter of Example 23, and includes evaluating the command databases of all of the virtual machines and selecting the scheduling policy for at least one of the virtual machines based on the evaluating of all of the command databases.

Example 25 includes the subject matter of Example 14, and includes scanning the GPU commands of all of the command buffers of a virtual machine, detecting cross-buffer dependencies between GPU commands in different command buffers of the same virtual machine, determining a frequency of occurrence of the cross-buffer dependencies over a period of time, and changing the scheduling policy based on the frequency of occurrence of the cross-buffer dependencies.

Example 26 includes the subject matter of Example 14, and includes monitoring for occurrences of cross-buffer dependencies across all of the command buffers of all of the virtual machines, and changing the scheduling policy from a per-ring policy to a gang policy if no cross-buffer dependencies are detected in a selected number of the command buffers.

Example 27 includes a computing device comprising a processor and memory having stored therein a plurality of instructions that when executed by the processor cause the computing device to perform the method of any of Examples 14-26.

Example 28 includes one or more machine readable storage media including a plurality of instructions stored thereon that in response to being executed result in a computing device performing the method of any of Examples 14-26.

Example 29 includes a computing device comprising means for performing the method of any of Examples 14-26.

Example 30 includes a system for scheduling workload submissions for a virtualized graphics processing unit (GPU). The system includes means for establishing a virtualization environment comprising a plurality of virtual machines, each of the virtual machines comprising a graphics driver to communicate with the GPU and a plurality of command buffers to store GPU commands; means for evaluating the GPU commands of all of the command buffers of all of the virtual machines; means for, in response to output of the evaluating of the GPU commands, dynamically selecting a scheduling policy from a plurality of different scheduling policies; and means for scheduling at least one of the GPU commands for processing by the GPU according to the dynamically selected scheduling policy.

Example 31 includes the subject matter of Example 30, and includes, for each of the virtual machines, means for creating a command database comprising data indicating dependencies between the command buffers of the virtual machine.

Example 32 includes the subject matter of Example 31, and includes means for evaluating the command databases of all of the virtual machines and selecting the scheduling policy for at least one of the virtual machines based on the evaluating of all of the command databases.

Example 33 includes the subject matter of Example 30, and includes means for scanning the GPU commands of all of the command buffers of a virtual machine, detecting cross-buffer dependencies between GPU commands in different command buffers of the same virtual machine, determining a frequency of occurrence of the cross-buffer dependencies over a period of time, and changing the scheduling policy based on the frequency of occurrence of the cross-buffer dependencies.

Example 34 includes the subject matter of Example 30, comprising means for monitoring for occurrences of cross-buffer dependencies across all of the command buffers of all of the virtual machines, and changing the scheduling policy from a per-ring policy to a gang policy if no cross-buffer dependencies are detected in a selected number of the command buffers.

The invention claimed is:

1. At least one machine-readable storage device for use in connection with a graphics processing unit (GPU) having a first engine and a second engine capable of executing commands in parallel with each other, the at least one machine-readable storage device comprising instructions that, when executed, cause at least one processor to at least:
populate a first command queue with a first GPU command, the first engine capable of executing commands in the first command queue, the first engine not capable of executing commands in a second command queue;
populate the second command queue with a second GPU command, the second engine capable of executing commands in the second command queue;
populate the second command queue with a wait operation to cause serial execution of the first GPU command by the first engine and execution of the second GPU command by the second engine;
cause the first engine to execute the first GPU command; and
cause the second engine to execute the second GPU command after the first engine has completed the execution of the first GPU command.

2. The at least one machine-readable storage device of claim 1, wherein the instructions, when executed, cause the at least one processor to schedule execution of a privileged command for execution by the second engine prior to execution of the second GPU command.

3. The at least one machine-readable storage device of claim 1, wherein the copy command queue is to operate as a ring buffer.

4. The at least one machine-readable storage device of claim 1, wherein the second command, when executed, causes the second engine to perform a 3D rendering task.

5. The at least one machine-readable storage device of claim 4, wherein the first command, when executed, causes the first engine to perform a copy task.

6. The at least one machine-readable storage device of claim 1, wherein the first command is to drive the first engine.

7. The at least one machine-readable storage device of claim 6, wherein the second command is to drive the second engine.

8. A computing device comprising:
memory;
at least one graphics processing unit (GPU) including a first engine and a second engine, the first engine capable of executing commands in a first command queue, the first engine not capable of executing commands in a second command queue, the second engine capable of executing commands in the second command queue;
at least one processor to execute instructions to at least:
populate the first command queue with a first GPU command;
populate the second command queue with a second GPU command, the second command queue being a 3D rendering queue;
populate a wait operation in the second command queue to cause serial execution of the first GPU command by the first engine and execution of the second GPU command by the second engine;
cause the first engine to execute the first GPU command;
cause the second engine to execute the second GPU command after the first engine has completed the execution of the first GPU command due to the wait operation.

9. The computing device of claim 8, wherein the at least one processor is to schedule execution of a privileged command for execution by the second engine prior to execution of the second GPU command.

10. The computing device of claim 8, wherein the first command queue is to operate as a ring buffer.

11. The computing device of claim 8, wherein the second command, when executed, causes the second engine to perform a 3D rendering task.

12. The computing device of claim 11, wherein the first command, when executed, causes the first engine to perform a copy task.

13. The computing device of claim 8, wherein the first command is to drive the first engine.

14. The computing device of claim 13, wherein the second command is to drive the second engine.

15. An apparatus for use in connection with a graphics processing unit (GPU) having a first engine and a second engine capable of executing commands in parallel with each other, the apparatus comprising:
means for populating to populate a first command queue with a first GPU command, the first engine capable of executing commands in the first command queue, the first engine not capable of executing commands in a second command queue, the means for populating to populate the second command queue with the second GPU command, the second engine capable of executing commands in the second command queue, the means for populating to populate to utilize a wait operation in the second command queue to cause serial execution of the first GPU command by the first engine and execution of the second GPU command by the second engine; and means for causing the first engine to execute the first GPU command, the means for causing to cause the second engine to execute the second GPU command after the first engine has completed the execution of the first GPU command due to the wait operation.

16. The apparatus of claim 15, further including means for scheduling execution of a privileged command for execution by the second engine prior to execution of the second GPU command.

17. The apparatus of claim 15, wherein the copy command queue is to operate as a ring buffer.

18. The apparatus of claim 17, wherein the second command, when executed, causes the second engine to perform a 3D rendering task.

19. The apparatus of claim 15, wherein the first command, when executed, causes the first engine to perform a copy task.

20. The apparatus of claim 19, wherein the first command is to drive the first engine.

21. The apparatus of claim 15, wherein the second command is to drive the second engine.

\* \* \* \* \*